(12) United States Patent
Okigami

(10) Patent No.: US 6,788,427 B1
(45) Date of Patent: Sep. 7, 2004

(54) PRINT DATA CONTROLLING METHOD

(75) Inventor: Masafumi Okigami, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/499,941

(22) Filed: Feb. 8, 2000

(30) Foreign Application Priority Data

Feb. 8, 1999 (JP) .......................................... 11-029825

(51) Int. Cl.$^7$ ............................................. G06K 15/00
(52) U.S. Cl. ..................... 358/1.15; 358/1.18; 358/1.13
(58) Field of Search ................. 358/1.1, 1.11, 358/1.13, 1.14, 1.15, 1.18, 1.16; 715/524; 710/8, 10, 14, 15, 16, 18, 72, 74

(56) References Cited

U.S. PATENT DOCUMENTS

| | | | |
|---|---|---|---|
| 873,007 A | 12/1907 | Bausch | |
| 5,500,715 A | 3/1996 | Ta et al. | ..................... 355/204 |
| 5,832,301 A | * 11/1998 | Yamaguchi | .................. 710/48 |

FOREIGN PATENT DOCUMENTS

| | | |
|---|---|---|
| EP | 0 856 997 A2 | 8/1998 |
| JP | 59-209161 | 11/1984 |
| JP | 2-297665 | 12/1990 |
| JP | 3-233666 | 10/1991 |
| JP | 6-223012 | 8/1994 |
| JP | 6-242895 | 9/1994 |
| JP | 7-9739 | 1/1995 |
| JP | 7-210345 | 8/1995 |
| JP | 8-95876 | 4/1996 |
| JP | 8-221227 | 8/1996 |
| JP | 09-212318 | 8/1997 |
| JP | 9282842 | 10/1997 |
| JP | 10-187388 | 7/1998 |
| JP | 10-198531 | 7/1998 |
| JP | 10-215473 | 8/1998 |
| JP | 11-95942 | 4/1999 |
| JP | 2000-122835 | 4/2000 |

* cited by examiner

*Primary Examiner*—Arthur G. Evans
(74) *Attorney, Agent, or Firm*—David A. Tucker; Edwards & Angell, LLP

(57) ABSTRACT

An object of the present invention is to provide a print data controlling method for correctly performing, even when a print request regarding the same or similar print data is repeatedly issued, a print procedure desired by a user without decrease in printer operating efficiency and waste of resources such as paper. As a decision result produced by a print server on the basis of a comparison of data specifying information contained in print requesting data with data specifying information attached to each print data spooled in a print queue, a terminal device receives decision data which informs that there has already been spooled print data identical with or similar to print data regarding a current print request. Then, the terminal device will accept designation input for designating a print data processing procedure, thereafter sending to the print server processing data representative of contents of the designated print data processing procedure. The print server processes the print data according to contents of the received processing data.

29 Claims, 9 Drawing Sheets

FIG. 8

| READY (READY FOR RECEIVING) |
|---|
| FILE NAME |
| CREATION DATE/TIME |
| FILE SIZE |
| APPLICATION NAME |
| USER NAME |
| TRANSMISSION TIME |
| TERMINAL IDENTIFIER |

(FILE NAME through TERMINAL IDENTIFIER) = DATA SPECIFYING INFORMATION

FIG. 9

| FILE NAME |
|---|
| CREATION DATE/TIME |
| FILE SIZE |
| APPLICATION NAME |
| USER NAME |
| TRANSMISSION TIME |
| TERMINAL IDENTIFIER |
| PRINT DATA (BODY PORTION) |

(FILE NAME through TERMINAL IDENTIFIER) = DATA IDENTIFYING INFORMATION

FIG. 11A

CURRENTLY PRINT-REQUESTED DATA (A) IS IDENTICAL WITH DATA (B) PRESENTLY ARRANGED IN PRINT WAITING QUEUE. CHOOSE ONE OF FOLLOWING PRINT DATA PROCESSING PROCEDURES.

○ CONTINUE PRINTING OF BOTH DATA (A) AND DATA (B)
○ CANCEL PRINTING OF DATA (A)
◎ CANCEL PRINTING OF DATA (A) AND PERFORM ADDITIONAL PRINTING OF DATA (B) (ONE COPY TO BE ADDED)
○ CANCEL PRINTING OF DATA (B)

○ CANCEL PRINTING OF BOTH DATA (A) AND DATA (B)

[ OK ]

PRINTING WILL BE STARTED IN 30 SECONDS.

FIG. 11B

CURRENTLY PRINT-REQUESTED DATA (A) IS SIMILAR TO DATA (B) PRESENTLY ARRANGED IN PRINT WAITING QUEUE. CHOOSE ONE OF FOLLOWING PRINT DATA PROCESSING PROCEDURES.

◎ CONTINUE PRINTING OF BOTH DATA (A) AND DATA (B)
○ CANCEL PRINTING OF DATA (A)
○ CANCEL PRINTING OF DATA (A) AND PERFORM ADDITIONAL PRINTING OF DATA (B) (ONE COPY TO BE ADDED)
○ CANCEL PRINTING OF DATA (B)
○ INSTEAD OF DATA (A), PRINT DIFFERENT PAGES OF DATA (A) FROM DATA (B)
○ CANCEL PRINTING OF BOTH DATA (A) AND DATA (B)

[ OK ]

PRINTING WILL BE STARTED IN 30 SECONDS.

PRINT DATA CONTROLLING METHOD

BACKGROUND OF THE INVENTION

1. Field of the Invention

The present invention relates to a print data controlling method in an information processing system for temporarily spooling print data outputted from a terminal device in a print queue of a print server for forwarding to a printer.

2. Description of the Related Art

In an information processing system, such as a local area network (LAN), when print requests are issued to a printer from individual terminal devices such as computers on the client end, print data regarding these print requests are temporarily spooled in a print queue of a print server. Thereafter, these print data is delivered to the printer from which they are printed out one after another.

In an information processing system of the type described above, however, it is difficult to know an association between the print queue and the printer. Moreover, there may be a case in which, although the print data in point has already been spooled in the print queue, a print request regarding the same print data is reissued from the terminal device. Not only does such repetition of issuing a print request regarding the same print data result in the drop in printer operating efficiency, but it also results in the waste of resources such as paper.

The following techniques to cope with the problem have been disclosed. Japanese Unexamined Patent Publication JP-A 7-210345 (1995) discloses a method which enables a user to confirm and set the relation between a printer connected to a network and a print queue on a graphical user interface (GUI) screen.

Japanese Unexamined Patent Publication JP-A 3-233666 (1991) discloses a method in which when print data retransmission is carried out because of a failure during an initial transmission, pages print data of which is overlapped between the initial transmission and the retransmission are deleted in printing.

Japanese Unexamined Patent Publication JP-A 8-221227 (1996) discloses a method in which print data which was already subjected to print processing is stored in a history queue for a predetermined period of time, and in the event of printing of the same print data as the data which was already subjected to print processing, the print data in the history queue is utilized without transmitting the print data to be reprinted.

These prior art techniques, however, have a common problem. That is, when, after a print request regarding particular print data is issued from a terminal device without the occurrence of a failure, another print request regarding the same print data is repeatedly issued because of, for example, the user's erroneous operation, this will produce some problems. One problem is that there occurs the drop in printer operating efficiency. Another problem is that it is impossible to ensure that the waste of resources such as paper is prevented.

SUMMARY OF THE INVENTION

An object of the present invention is to provide a print data controlling method capable of carrying out print processing desired by a user without decreasing printer operating efficiency and without wasting resources such as paper. More specifically, when a print request regarding the same or similar print data is repeatedly issued from a terminal device by the user, the user is allowed, after the fact that the print data regarding the current print request totally or partially overlaps with the print data regarding the previously-issued print request is confirmed, to designate a print data processing procedure so that the print data is processed according to the designated print data processing procedure.

The invention provides a print data controlling method in which print data regarding a print request which has been issued from a terminal device is temporarily spooled in a print queue and supplied from the print queue to a printer, comprising the steps of:

comparing print data regarding a current print request with print data which is previously spooled in the print queue;

transmitting a result of the comparison to the terminal device which has issued the current print request; and generating a warning message in the terminal device when the result of the comparison indicates that print data identical with or similar to the print data regarding the current print request is previously spooled in the print queue.

According to the print data controlling method of the invention, when a terminal device issues a print request, the print data regarding the current print request is compared with the print data previously spooled in the print queue and a result of the comparison is transmitted to the terminal device. When print data identical with or similar to the print data regarding the current print request is previously spooled in the print queue, a warning message indicative of such spooling is generated in the terminal device. This ensures that the user who issued the current print request becomes, by the warning message, aware of the fact that there has previously been spooled the print data identical with or similar to the print data regarding the current print request in the print queue. With the arrangement, it becomes possible to prompt the user to input a processing instruction with respect to the print data regarding the current print request or the print data previously spooled in the print queue.

In the invention it is preferable that when the comparison result indicates that print data identical with or similar to the print data regarding the current print request is previously spooled in the print queue, an input operation for designating a print data processing procedure of how to process the print data regarding the current print request and the previously spooled print data is accepted by the terminal device to which the comparison result was transmitted and the print data is processed according to the designated print data processing procedure.

According to the print data controlling method of the invention, when a print request is issued from a terminal device, a result of comparing the print data regarding the issued print request with print data previously spooled in the print queue is transmitted to the terminal device. The print data is processed according a print data processing procedure designated in the terminal device which is in receipt of the comparison result. In other words, such a comparison result is used as a base of determining whether the current print request is proper or improper in the terminal device and the print data is processed by a print data processing procedure according to the determination operation result. As a result of such arrangement, even when a print request for the printing of print data identical with or similar to the print data previously spooled is erroneously issued, it is possible to execute a printing process desired by the user without waste, thereby ensuring that the drop in printer operating efficiency and the waste of resources such as paper are prevented.

In the invention it is preferable that the step of comparing the print data regarding the current print request with the print data previously spooled in the print queue is carried out with respect to contents of print data.

According to the print data controlling method of the invention, the contents of the print data regarding the current print request and the contents of the print data regarding the previously-issued print request (which has already been spooled in the print queue) are compared with each other, which therefore makes it possible to correctly compare the print data regarding the current print request and the print data regarding the previously-issued print request. As a result, it is possible to correctly determine whether the current print request is proper or improper.

In the invention it is preferable that the step of comparing the print data regarding the current print request with the print data previously spooled in the print queue is carried out based on data representative of characteristics of print data.

According to the print data controlling method of the invention, the data representative of the characteristics of the print data regarding the current print request and the data representative of the characteristics of the print data regarding the previously-issued print request (which has already been spooled in the print queue) are compared with each other. Therefore, the amount of comparison data is reduced, and processing time is shortened.

In the invention it is preferable that the step of comparing the print data regarding the current print request with the print data previously spooled in the print queue is carried out based on contents of print requesting data which is outputted earlier than print data.

According to the print data controlling method of the invention, the contents of the print requesting data which was outputted earlier than the print data regarding the current print request is compared with the contents of the print requesting data about the print data regarding the previously-issued print request previously spooled in the print queue. Therefore, it is possible to determine whether the current print request is proper or improper before the print data regarding the current print request is outputted. This makes it possible to prevent print data which will not be printed in a later process from being outputted from the terminal device. Because of such arrangement, the receiving/transmitting of data in the terminal device is smoothed.

Moreover, in the invention it is preferable that the step of comparing the print data regarding the current print request with the print data previously spooled in the print queue is carried out with respect to only print data regarding a print request previously issued from a same terminal device or user as that from which the print request is currently issued.

According to the print data controlling method of the invention, the print data comparison step is carried out on only the print data outputted before the print data regarding the current print request, from the terminal device/user which issued the current print request. Accordingly, such arrangement not only reduces the frequency at which a comparison process is executed but also prevents a comparison result for print data outputted from a different terminal device/user from being transmitted to the terminal device which issued the current print request, thereby ensuring that processing confusion/complication is prevented from occurring.

In the invention it is preferable that a print data processing procedure of how to process the print data regarding the current print request and the previously spooled print data can be designated from among a plurality of previously-set print data processing procedures.

According to the print data controlling method of the invention, any one of the previously-set print data processing procedures is selectively designated as a way of processing the print data. This therefore provides a simplified operation for designating a print data processing procedure.

In the invention it is preferable that the plurality of print data processing procedures includes a print data processing procedure contents of which indicate an operation of canceling at least one of printing of the print data regarding the current print request and printing of the print data which is previously spooled in the print queue and is identical with or similar to the print data regarding the current print request.

According to the print data controlling method of the invention, in accordance with the selectively-designated print data processing procedure, at least one of the printing of the print data regarding the current print request and the printing of the print data which is previously spooled in the print queue and is identical with or similar to the print data regarding the current print request is canceled. Accordingly, even when a print request is issued for the printing of print data identical with the print data whose print request has already been issued or for post-modification print data similar thereto, only the printing of print data desired by the user is carried out without waste.

In the invention it is preferable that the plurality of print data processing procedures includes a print data processing procedure contents of which indicate an operation of making a change in print condition of print data which is previously spooled in the print queue and is identical with or similar to the print data regarding the current print request.

According to the print data controlling method of the invention, in accordance with the selectively-designated print data processing procedure, the print data, which is previously spooled in the print queue and is identical with or similar to the print data regarding the current print request, is printed with a change in print condition. Accordingly, even when a print request is issued for the printing of print data identical with the print data whose print request has already been issued or for the printing of post-modification print data similar thereto, only the printing of print data based on the print condition desired by the user is carried out without waste.

In the invention it is preferable that the plurality of print data processing procedures includes a print data processing procedure contents of which indicate an operation of extracting a difference between the print data regarding the current print request and the print data previously spooled in the print queue so as to perform only the printing of the extracted difference.

According to the print data controlling method of the invention, in accordance with the selectively-designated print data processing procedure, only the difference between the print data regarding the current print request and the previously spooled print data is subjected to printing. Accordingly, even when a print request is issued for the printing of print data similar to the print data whose print request has already been issued, only the printing of print data based on the print condition desired by the user is carried out without waste.

In the invention it is preferable that after a predetermined period of time has elapsed without designating of any particular print data processing procedure for the print data regarding the current print request and the already-spooled print data, the print data is processed according to a default print data processing procedure.

According to the print data controlling method of the invention, after a predetermined period of time has elapsed without the designation of any particular print data processing procedure in the terminal device, print data processing is performed according to the default print data processing procedure. This prevents the absence of designation of a certain print data processing procedure in the terminal device which is the origin of the current print request, thereby preventing the processing of the print data from being interrupted for a long period of time. This prevents a decrease in processing efficiency.

BRIEF DESCRIPTION OF THE DRAWINGS

Other and further objects, features, and advantages of the invention will be more explicit from the following detailed description taken with reference to the drawings wherein:

FIG. 8 is a diagram illustrating contents of reception-ready data which is transmitted from the print server to the terminal device;

FIG. 9 is a diagram illustrating contents of print data which is transmitted from the terminal device to the print server;

FIGS. 11A and 11B each illustrate display contents of a print data processing procedure selecting screen in a terminal device display.

DETAILED DESCRIPTION OF THE PREFERRED EMBODIMENTS

Figure 1:
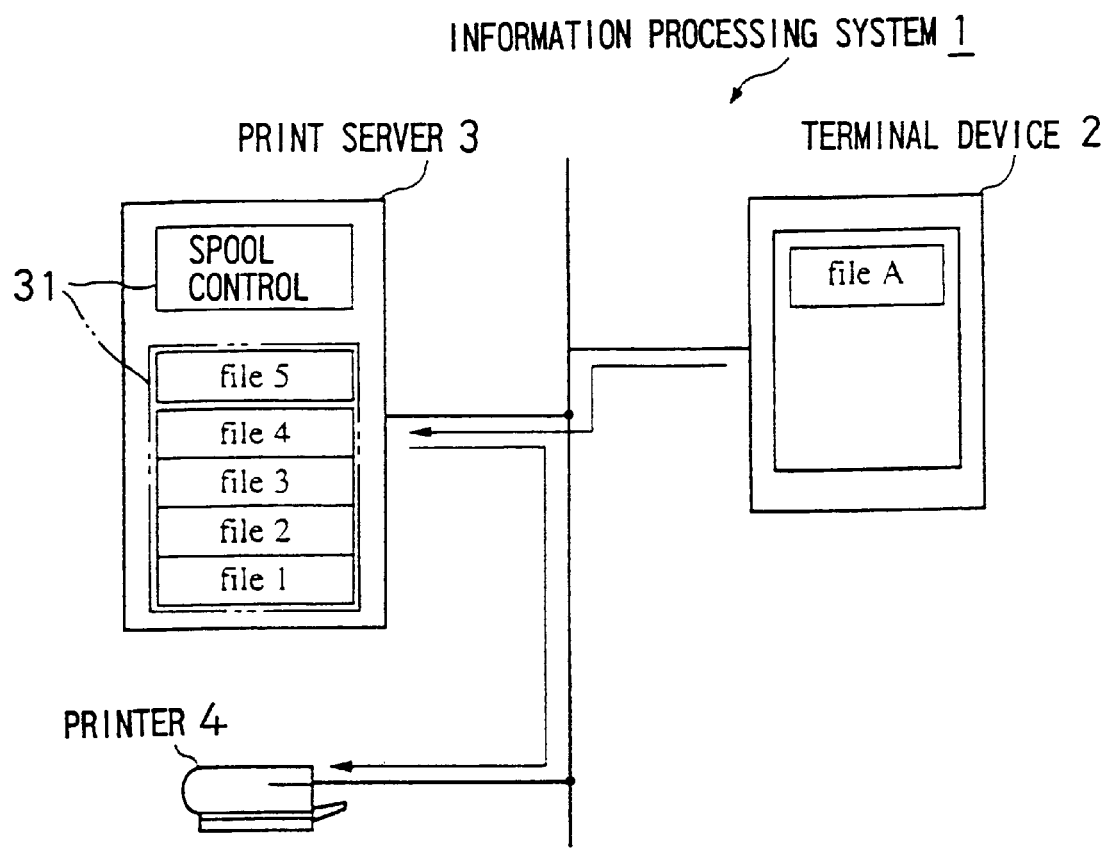
FIG. 1 is a diagram illustrating a configuration of an information processing system to which a print data controlling method according to an embodiment of the invention is applied.

Now referring to the drawings, preferred embodiments of the invention are described below.

Referring first to FIG. 1, there is shown a configuration of an information processing system to which a print data controlling method according to an embodiment of the invention is applied. In an information processing system 1 according to the present embodiment, a terminal device 2 located on the client end such as a user computer is connected, via a print server 3, to a printer 4. When a print request is issued to the printer 4 from the terminal device 2, print data regarding the print request is temporarily spooled in a print queue 31 of the print server 3. Thereafter, the print data thus spooled is supplied from the print server 3 to the printer 4, so that printing takes place in sequence in the printer 4. Further, the terminal device 2 and the printer 4 are each connected, either singly or plurally, to the information processing system 1.

Usually, the print server 3 spools print data outputted from the terminal device 2 in the print queue 31 in the order in which they were received, and these print data is read out in the order in which they were spooled in the print queue 31, thereafter being transmitted to the printer 4. For example, with five files (i.e., files 1 to 5) previously spooled in the print queue 31 of the print server 3, when a print request regarding a file A as print data is outputted from the terminal device 2, contents of the file A are spooled in the print queue 31 as a sixth file 6. After the printing of each of the files 1–5 has been completed, the contents of the file A are supplied to the printer 4.

In the information processing system 1, the printer 4, when a print request is outputted from any one of the terminal devices 2, does not always start the printing of print data regarding the print request immediately after the print request was outputted. The time from when a print request is outputted to when the printing of print data regarding to the print request is completed varies depending upon the print data spool state of the print queue 31 of the print server 3. Because of such variation, when many pieces of print data is spooled in the print queue 31, the user, who carried out an operation to issue a print request, may make a misunderstanding that a failure has occurred during the transmission of the print request. This is likely to cause the user to reissue a print request regarding the same print data as previously requested to be printed. Moreover, when a lengthy period of time is elapsed from when a print request is outputted to when the printing of print data regarding to the print request is executed, this may result in making a modification in contents of the print data regarding the print request or a change in the printing condition of the print data regarding the print request such as the number of copies to be printed.

In the print data controlling method according to the embodiment of the invention, it is therefore designed such that, whenever a terminal device 2 outputs a print request, print data regarding the print request is compared with each print data that has already been spooled in the print queue 31 of the print server 3. When there already exists print data in the print queue 31 which is identical with or similar to the print data regarding the current print request, then a warning message is generated to the terminal device 2 which outputted the current print request.

Figure 2:
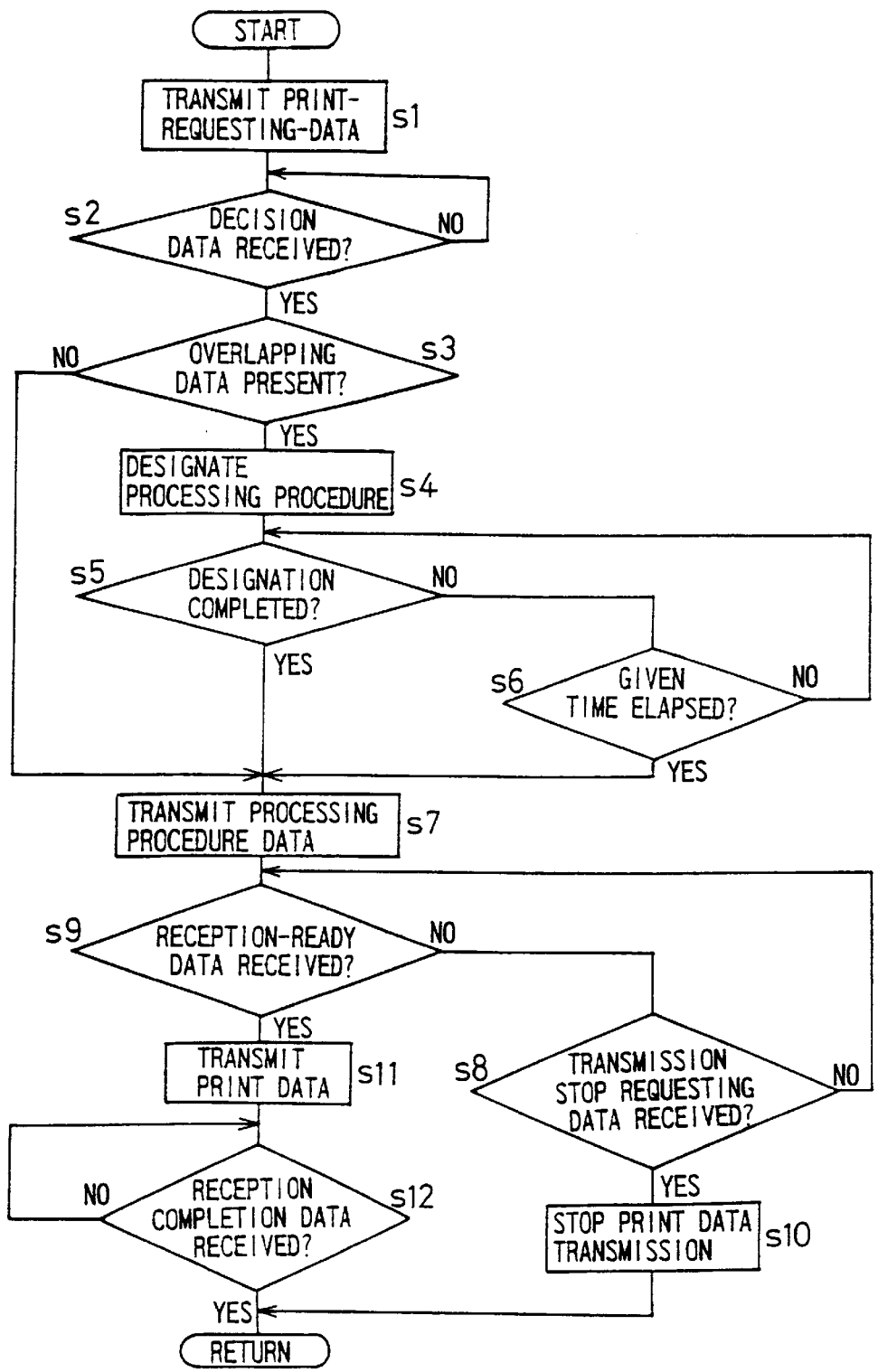
FIG. 2 is a flowchart diagram illustrating a processing procedure of a terminal device included in the information processing system.
Figure 3:
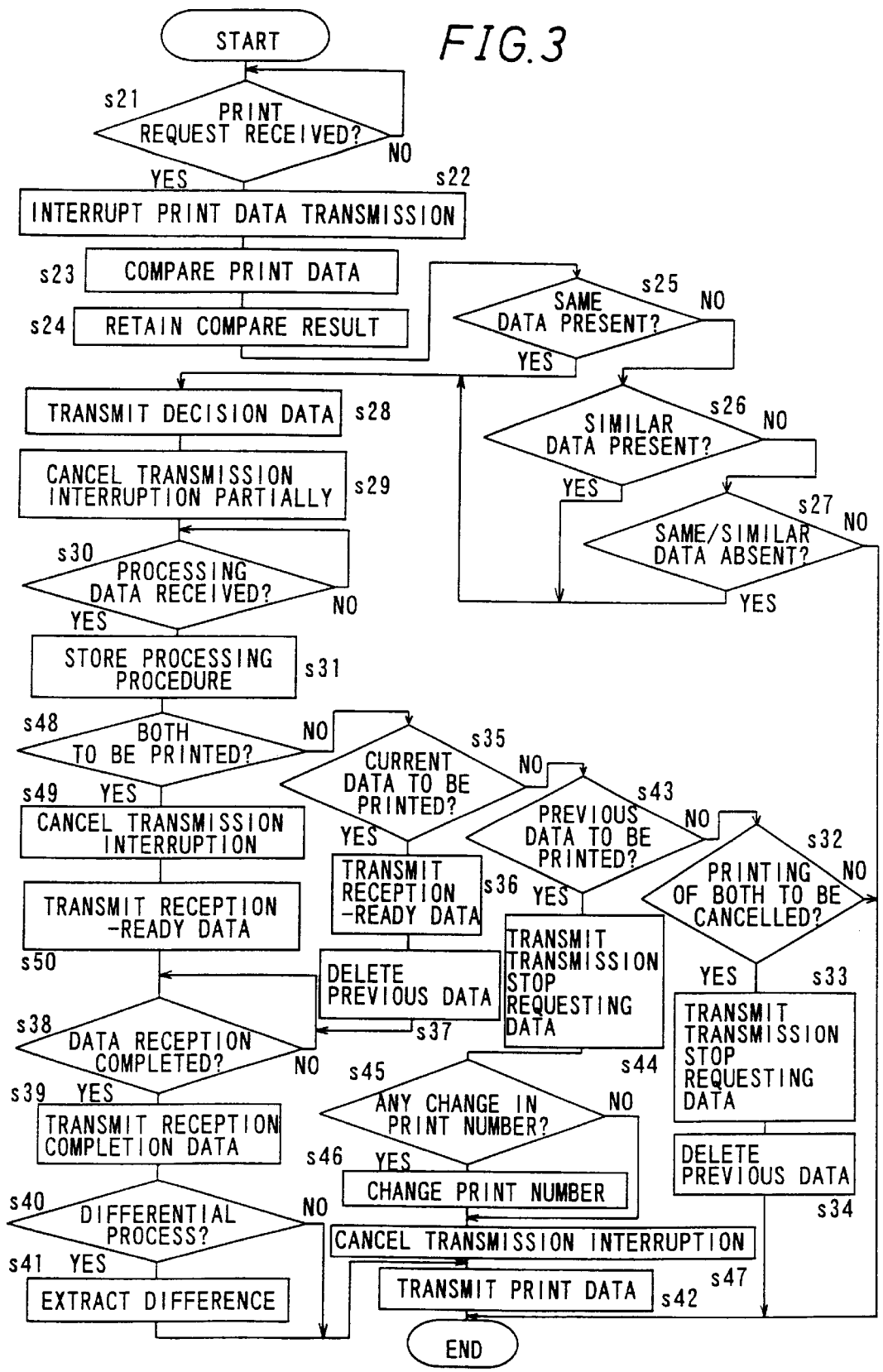
FIG. 3 is a flowchart diagram illustrating an example of processing procedure of a print server included in the information processing system.
Figure 4:
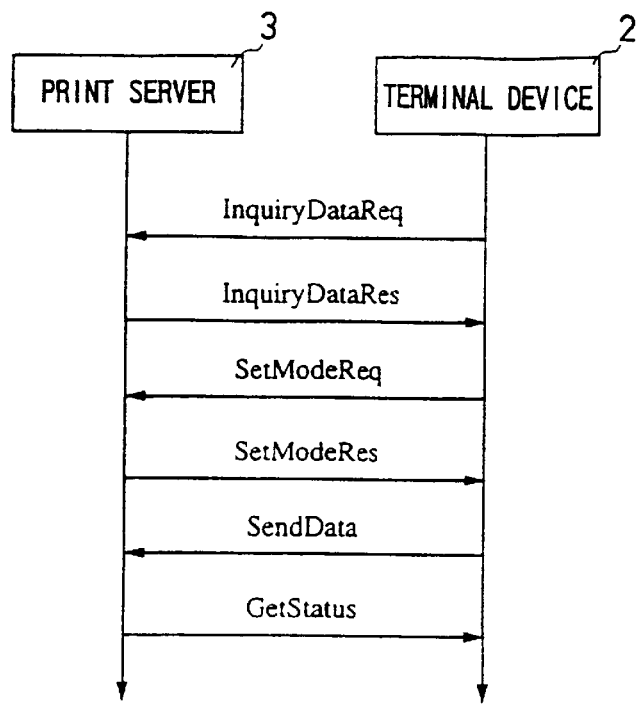
FIG. 4 is a diagram illustrating protocols used for a process of exchanging data between the terminal device and the print server.

FIG. 2 is a flowchart diagram showing a processing procedure of the terminal device included in the information processing system. FIG. 3 is a flowchart diagram showing an example of a processing procedure of the print server included in the information processing system. Moreover, FIG. 4 is a diagram showing protocols for the process of exchanging data between the terminal device 2 and the print server 3. FIGS. 5–10 show structures of data of different types which are exchanged between the terminal device 2 and the print server 3. The description will be made by reference to FIGS. 2–10.

Figure 5:
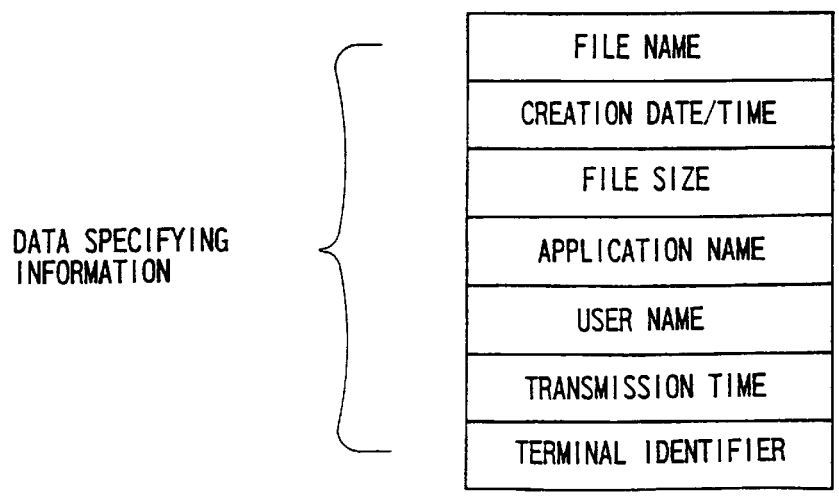
FIG. 5 is a diagram illustrating contents of print requesting data which is transmitted from the terminal device to the print server.

As shown in FIG. 2, when the user carries out an operation which instructs specific file data to be printed, the terminal device 2 transmits print requesting data, i.e., "Inquiry Data Req" as shown in FIG. 4, to the print server 3 (s1). The print requesting data comprises, as shown in FIG. 5, data specifying information about the file data (i.e., the print data) such as a file name, creation date and time, file size, application name, user name, transmission time, and terminal device identifier.

Figure 6:
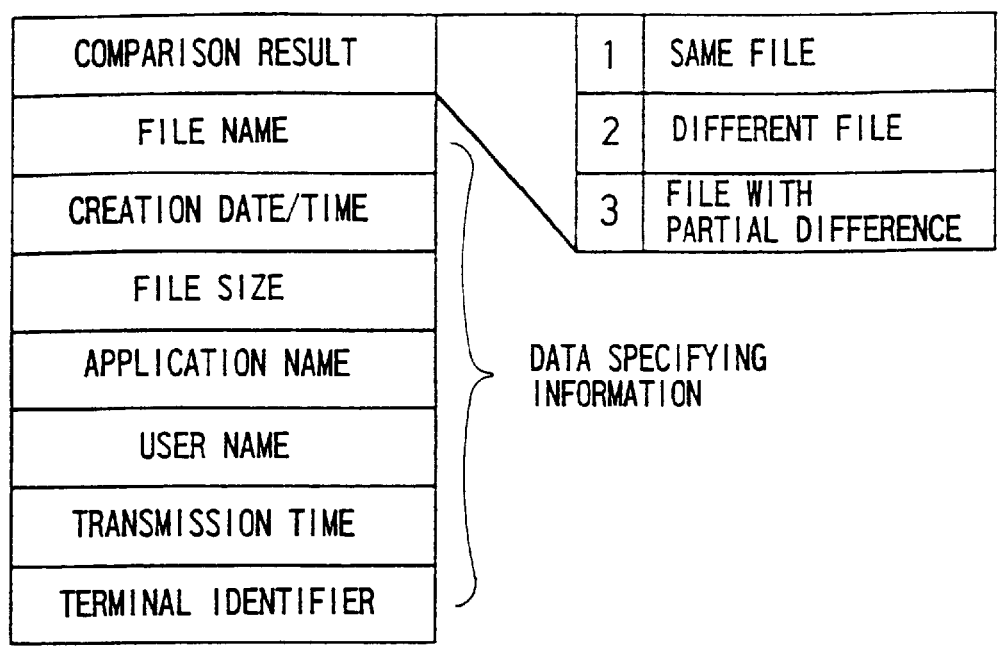
FIG. 6 is a diagram illustrating contents of decision data which is transmitted from the print server to the terminal device.

As shown in FIG. 3, upon receipt of the print requesting data (s21), the print server 3 interrupts the transmitting of print data spooled in the print queue 31 to the printer 4 (s22). Then, the print server 3 makes a comparison between the data specifying information contained in the received print requesting data and data specifying information attached to each print data spooled in the print queue 31 so as to determine whether the print queue 31 has already spooled print data having the same or similar data specifying information (s23). The print server 3 stores a result of the comparison (s24). Thereafter, the print server 3 transmits to the terminal device 2 decision data (i.e., "Inquiry Data Res" as shown in FIG. 4) according to whether there exists the same print data, whether there exists the similar print data, or whether there does not exist the same or similar print data (s25–s28). Then, the print server 3 cancels the interruption of the transmitting of the print data other than the print data regarding the current print request, from the print queue 31 to the printer 4 (s29). The decision data comprises data representative of a result of the comparison as shown in FIG. 6 and the data specifying information of the print requesting data of FIG. 5.

Figure 7:
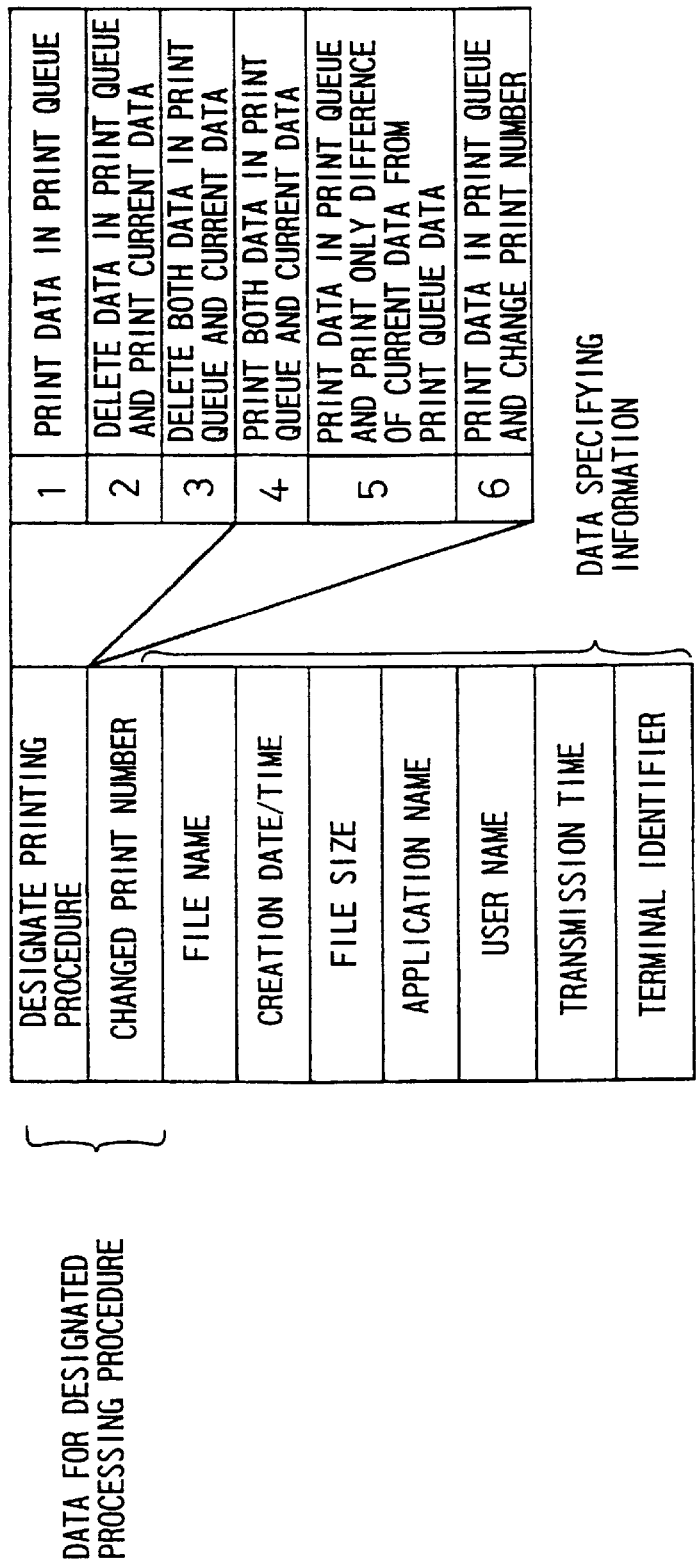
FIG. 7 is a diagram illustrating contents of processing data which is transmitted from the terminal device to the print server.

Reference is made again to FIG. 2. Upon receipt of the decision data from the print server 3 (s2), the terminal device 2 checks, with respect to contents of the decision data, the print queue 31 for the presence or absence of print data identical with or similar to the print data regarding the current print request (s3). In the presence of the same or similar print data in the print queue 31, the terminal device 2 accepts an input for designating one of print data processing procedures (s4). Upon completion of the print data processing procedure designating input, or after an elapse of a predetermined period of time (s5, s6), the terminal device 2 transmits processing data representative of contents of the designated print data processing procedure, i.e., "Set Mode Req" as shown in FIG. 4, to the print server 3 (s7). The processing data comprises data representative of a designated print data processing procedure as shown in FIG. 7 and data specifying information about print data to be processed by the designated print data processing procedure.

Reference is made again to FIG. 3. Upon receipt of the processing data from the terminal device 2 (s30), the print server 3 stores the processing data in a memory device (not shown) (s31) and executes, according to contents of the processing data, any one of the following four different procedures, namely, procedure A, procedure B, procedure C, and procedure D.
Procedure A When the contents of the processing data transmitted from the terminal 2 indicate such a processing procedure of stopping printing of both the print data regarding the current print request and the print data which is previously spooled in the print queue 31 and identical with or similar to the print data regarding the current print request, the print server 3 then sends to the terminal device 2 transmission stop request data requesting that the transmission of the print data regarding the current print request be stopped. At the same time, the print server deletes print data of all the print data previously spooled in the print queue 31 corresponding to the data specifying information of the processing data (s32–s34).
Procedure B When the contents of the processing data transmitted from the terminal device 2 indicate a processing procedure of carrying out printing of only the print data regarding the current print request, the print server 3 then sends to the terminal device 2, reception-ready data requesting for the transmission of the print data, i.e., "Set Mode Res" as shown in FIG. 4. At the same time, the print server 3 deletes print data of all the print data previously spooled in the print queue 31 corresponding to the data specifying information of the processing data (s35–s37). The reception-ready data comprises data representative of a reception-ready status as shown in FIG. 8 and the data specifying information of FIG. 5.
Procedure C When the contents of the processing data transmitted from the terminal device 2 is related to such a processing procedure in which only the printing of the print data which is previously spooled in the print queue 31 and regarding the previously-issued print request is printed, the print server 3 then sends to the terminal device 2 transmission stop requesting data requesting that the transmission of the print data regarding the current print request be stopped (s43, s44). Moreover, when the processing data indicates that a change in the number of copies to be printed is to be made, the print server 3 changes the number of copies to be printed of the print data corresponding to the data specifying information of the processing data spooled in the print queue 31 (s45, s46). Thereafter, the print server 3 cancels the interruption of the transmitting of the print data identical with or similar to the print data regarding the current print request, from the print queue 31 to the printer 4 (s47).
Procedure D When the contents of the processing data transmitted from the terminal device 2 is related to such a processing procedure in which printing of both the print data regarding the current print request and the print data which is previously spooled in the print queue 31 and identical with or similar to the print data regarding the current print request is executed, the print server 3 then cancels the interruption of the transmitting of the print data identical with or similar to the print data regarding the current print request, from the print queue 31 to the printer 4. The print server 3 sends to the terminal device 2 the reception-ready data of FIG. 8 requesting for the transmission of the print data (s48–s50).

Reference is made again to FIG. 2. After having transmitted the processing data to the print server 3 at the step S7, the terminal device 2 is put on standby for the transmission of data from the print server 3 (s8, s9). The terminal device 2 will execute either one of the following two different procedures (procedure α and procedure β), depending upon which of the transmission stop requesting data and the reception-ready data the terminal device 2 receives.
Procedure α

When the print server 3 sends the transmission stop requesting data in procedure A or procedure C, the terminal device 2 cancels the transmitting of the print data regarding the current print request (s8→s10).
Procedure β

When the print server 3 sends the reception-ready data in procedure B or procedure D, the terminal device 2 then sends to the print server 3 the print data regarding the current print request, i.e., "Send Data" as shown in FIG. 4, (s9→s11). The terminal device 2 waits for the print server 3 to transmit the reception completion data (s12). As shown in FIG. 9, data identifying information equivalent to the data specifying information is attached to the print data.

Figure 10:
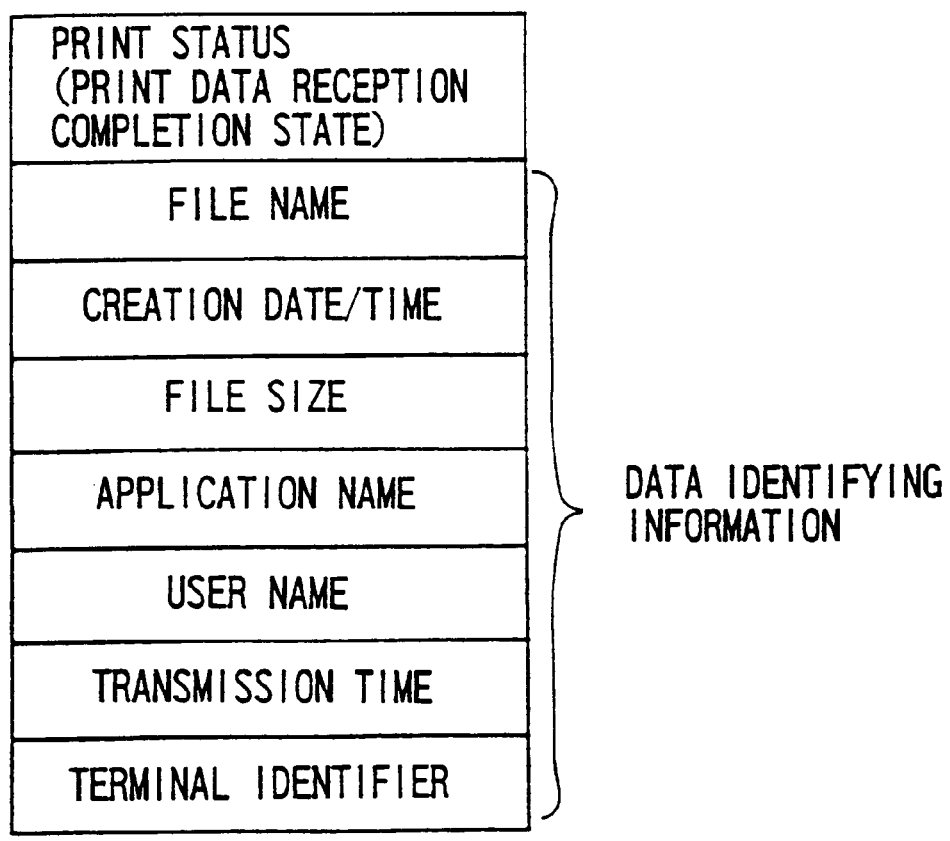
FIG. 10 is a diagram illustrating contents of reception-completion data which is transmitted from the print server to the terminal device.

Again, reference is made to FIG. 2. When the print server 3 sends the reception-ready data in procedure B or D, the print server 3 receives the print data transmitted in procedure β from the terminal device 2. Upon completion of the receiving of the print data, the print server 3 sends to the terminal device 2 the reception completion data ("Get Status" as shown in FIG. 4) (s38, s39). The reception completion data comprises data representative of a print data reception completion status as shown in FIG. 10 and data identifying information.

After having transmitted the reception completion data, the print server 3 determines whether the processing data transmitted from the terminal device 2 contains therein the designation of a differential print procedure (s40). When the differential print procedure is designated, differences between print data of all the print data previously spooled in the print queue 31 that is similar to a currently-received print data and the currently-received print data is extracted and the entire of the similar print data is replaced with the different portions extracted from the similar print data (s41). Thereafter, changes in contents of the transmitting process of the print data from the print queue 31 to the printer 4 are fixed (s42). When the differential print procedure is not designated, then the contents of the transmitting process of the print data from the print queue 31 to the printer 4 are fixed without performing a difference extraction process or a replacement process (s40→s42).

According to the foregoing processes, in the information processing system 1, when the user instructs the terminal device 2 to print contents of file data, the terminal device 2 sends, according to the communication protocols as shown in FIG. 4, print requesting data comprising data specifying information for specifying the contents of the print data, to the print server 3. Based on contents of the print requesting data, in the print server 3 it is determined whether there exists print data identical with or similar to the print data regarding the current print request in the print queue 31 and the result is transmitted to the terminal device 2. The user of the terminal device 2 designates, based on the result transmitted from the print server 3, contents of a processing procedure to be performed later. The result of the designation is transmitted to the print server 3.

This ensures that the user becomes aware of the fact that the print data regarding the current print request is the print data which identical with or similar to the print data regarding the previously-issued print request, whereby the user is able to obtain correct, desired printout by designating a processing procedure with respect to the print data which totally or partially overlap with each other. Moreover, it is ensured that repetition of the printing of the same or similar print data caused by an erroneous operation by the user can be prevented. This prevents the drop in the operating efficiency of the printer 4 and the waste of resources from happening.

Of the communication protocols as shown in FIG. 4, the exchange of the reception-ready data (Set Mode Res), the print data (Send Data), and the reception completion data (Get Status) between the print server 3 and the terminal device 2 is selectively carried out.

Additionally, in the forgoing embodiment, the data specifying information, which forms the print requesting data, is used as a base of determining whether there has already been spooled print data identical with or similar to the print data regarding the current print request. However, it is possible to make such determination with respect to the contents of the print data or based on the data representative of the characteristic of the print data.

By using the contents of the print data as a base of determining whether there has already been spooled print data identical with or similar to the print data regarding the current print request, the identity of print data with another can be distinguished correctly. In this case, the print server 3 performs a distinction process after the receiving of the print data from the terminal device 2 has been completed. Moreover, by using the data representative of the characteristic of the print data as a base of determining whether there has already been spooled print data identical with or similar to the print data regarding the current print request, the amount of data for comparison in the distinction process is reduced and the distinction process is therefore simplified. In this case, for example, either a check sum which is an integrated value of block data added for every fixed block for the detection of an error during data transmission, or a character kind statistics which is an integrated value of character counts per character kind in each page may be used as the data representative of the characteristic of the print data. Additionally, the frequency of appearance per character code may be used.

Conversely, in the foregoing embodiment, the data specifying information, which forms the print requesting data, is used as a base of determining whether there has already been spooled print data identical with or similar to the print data regarding the current print request, which makes it possible to obtain a distinction result prior to performing the transmitting/receiving of the print data. Because of such arrangement, when the same or similar print data has already been spooled, it is possible to omit the receiving/transmitting of the print data regarding the current print request according to a processing procedure designated by the user. Accordingly, it is possible to smooth the receiving/transmitting of data in the information processing system 1.

Further, prior to performing a distinction process for determining whether there has already been spooled print data identical with or similar to the print data regarding the current print request, an arrangement may be made, wherein (a) the user name/terminal device identifier of the print data regarding the current print request is compared with the user name/terminal device identifier of each print data already spooled and (b) identity or similarity distinction processis performed, only on the print data having the same user name/terminal device identifier. As a result of such arrangement, it becomes possible to reduce the frequency at which the distinction processis executed, thereby to reduce the frequency at which print processing currently under execution is interrupted. Moreover, it is possible to prevent a distinction result indicative of the fact that the same or similar print data has already been spooled, from being transmitted to a wrong terminal device 2 or to a wrong user.

Furthermore, it is possibly considered that in the print procedure designating step in the terminal device 2 (s4), a list of print data processing procedures which can be designated by a user is displayed on the terminal device 2 so as to accept a selecting operation of selecting a print data processing procedure from the user. For example, the list of print data processing procedures designatable by the user includes (1) a first print data processing procedure in which both the printing of the print data regarding the current print request and the printing of the print data previously spooled are performed, (2) a second print data processing procedure in which only the printing of the print data previously spooled is performed, (3) a third print data processing procedure in which the printing of the print data previously spooled is performed, with a change in the print condition such as the number of copies to be printed, (4) a fourth print data processing procedure in which only the printing of the print data regarding the current print request is performed, (5) a fifth print data processing procedure in which the printing of the print data previously spooled and the printing of a difference between the print data regarding the current-issued print request and the already-spooled print data is performed, and (6) a sixth print data processing procedure in which both the printing of the print data regarding the current-issued print request and the printing of the print data previously spooled are stopped.

When there has already been spooled the same print data as the print data regarding the current print request, this will display a selection screen, as shown in FIG. 11A, on the display monitor of the terminal device 2. On the other hand, when the print data similar to the print data regarding the current print request has already been spooled, this will display a selection screen, as shown in FIG. 11B on the display monitor of the terminal device 2. This provides a simplified operation of designating a desired print data processing procedure to the user.

In this case, when a predetermined period of time has elapsed with no particular print data processing procedure designated by the user, a predetermined default print data processing procedure is automatically chosen. This provides the advantage that, even when the operation of designating a print data processing procedure has been deferred for a long period of time because the user is away from his or her terminal device 2, the transmitting of the print data from the print queue 31 to the printer 4 is not prevented from being interrupted for a long period of time (s22).

As described above, in the print data controlling method of the invention, when reception of new print data identical with or similar to the print data spooled in the print queue is detected, it is possible to allow the user to designate a print data processing procedure, regardless of whether there occurs a failure when data concerned with printing is received or transmitted. Accordingly, in comparison with conventional print data controlling methods, even when, immediately after certain data is transmitted, a modification of that data is sent off, it is possible for the user to select between "CONTINUE PRINTING" and "STOP PRINTING" with respect to the previously-transmitted data. This improves operability.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A print data controlling method in which print data regarding a print request which has been issued from a terminal device is temporarily spooled in a print queue and supplied from the print queue to a printer, comprising the steps of:

comparing print data regarding a current print request with print data which is previously spooled in the print queue;

transmitting a result of the comparison to the terminal device which has issued the current print request; and generating a warning message in the terminal device when the result of the comparison indicates that print data identical with or similar to the print data regarding the current print request is previously spooled in the print queue.

2. The print data controlling method of claim 1, wherein when the comparison result indicates that print data identical with or similar to the print data regarding the current print request is previously spooled in the print queue, an input operation for designating a print data processing procedure of how to process the print data regarding the current print request and the previously spooled print data is accepted by the terminal device to which the comparison result was transmitted and the print data is processed according to the designated print data processing procedure.

3. The print data controlling method of claim 1, wherein the step of comparing the print data regarding the current print request with the print data previously spooled in the print queue is carried out with respect to contents of print data.

4. The print data controlling method of claim 1, wherein the step of comparing the print data regarding the current print request with the print data previously spooled in the print queue is carried out based on data representative of characteristics of print data.

5. The print data controlling method of claim 1, wherein the step of comparing the print data regarding the current print request with the print data previously spooled in the print queue is carried out based on contents of print requesting data which is outputted earlier than print data.

6. The print data controlling method of claim 1, wherein the step of comparing the print data regarding the current print request with the print data previously spooled in the print queue is carried out with respect to only print data regarding a print request previously issued from a same terminal device or user as that from which the print request is currently issued.

7. The print data controlling method of claim 2, wherein a print data processing procedure of how to process the print data regarding the current print request and the previously spooled print data can be designated from among a plurality of previously-set print data processing procedures.

8. The print data controlling method of claim 7, wherein the plurality of print data processing procedures includes a print data processing procedure contents of which indicate an operation of canceling at least one of printing of the print data regarding the current print request and printing of the print data which is previously spooled in the print queue and is identical with or similar to the print data regarding the current print request.

9. The print data controlling method of claim 7, wherein the plurality of print data processing procedures includes a print data processing procedure contents of which indicate an operation of making a change in print condition of print data which is previously spooled in the print queue and is identical with or similar to the print data regarding the current print request.

10. The print data controlling method of claim 7, wherein the plurality of print data processing procedures includes a print data processing procedure contents of which indicate an operation of extracting a difference between the print data regarding the current print request and the print data previously spooled in the print queue so as to perform only the printing of the extracted difference.

11. The print data controlling method of claim 1, wherein after a predetermined period of time has elapsed without designating of any particular print data processing procedure for the print data regarding the current print request and the already-spooled print data, the print data is processed according to a default print data processing procedure.

12. A print data controlling method in which print data regarding a print request having been issued from a terminal device and print request data are spooled in a print queue, the print request data including a file size which represents a size of a file of the print data regarding a print request, and a user name of a user having issued the print request; and the print data is supplied from the print queue to a printer to be printed, the print data controlling method comprising:

determining whether to carry out a print operation with respect to the print data regarding the current print request on the basis of:
a result of determination of whether the print data regarding the current print request matches or mismatches with print data regarding a previous print request which print data is spooled in the print queue, the determination being based on comparison of a file size included in the print request data, and
a result of comparison of a user name of a user having issued the current print request with a user name of a user having issued the previous print request.

13. The print data controlling method of claim 12, wherein, in the case where the print data regarding the current print request matches with the print data regarding the previous print request and the user name of the user having issued the current print request matches with the user name of the user having issued the previous print request, at least the print operation to be carried out with respect to the print data regarding a current print request is canceled.

14. The print data controlling method of claim 12, wherein, in the case where the print data regarding the current print request matches the print data regarding the previous print request and the user name of the user having issued the current print request matches with the user name having issued the previous print request, at least print operation with respect to the print data regarding the previous print request which print data is spooled in the print queue is carried out.

15. The print data controlling method of claim 12, wherein the file size is an integrated value of character counts in print data regarding a print request.

16. The print data controlling method of claim 12, wherein the terminal device is connected to the printer via a printer server.

17. A print data controlling method in which print data regarding a print request having been issued from a terminal device and print request data are spooled in a print queue, the print request data including a file size which represents a size of a file of the print data regarding the print request, and a user name of a user having issued the print request; and the print data is supplied from the print queue to a printer to be printed, the print data controlling method comprising:
determining whether to carry out a print operation with respect to the print data regarding a current print request on the basis of a result of a comparison of the file size and the user name included in the print request data regarding the current request with the file size and the user name included in the print request data regarding the previous print request.

18. The print data controlling method of claim 17, wherein, in the case where the file size and the user name included in the print request data regarding a current print request matches with the file size and user name included in the print request data regarding the previous print request, respectively, at least print operation to be currently carried out with respect to the print data regarding the current print request is canceled.

19. The print data controlling method of claim 17, wherein, in the case where the file size and the user name included in the print request data regarding a current print request matches with the file size and user name included in the print request data regarding the previous print request, respectively, at least print operation with respect to the print data regarding the previous print request which print data is spooled in the print queue is carried out.

20. The print data controlling method of claim 17, wherein the file size is an integrated value of character counts in print data regarding a print request.

21. The print data controlling method of claim 17, wherein the terminal device is connected to the printer via a printer server.

22. A print data controlling method in which print data regarding a print request having been issued from a terminal device and print data are spooled in a print queue, the print request data including a file size which represents a size of a file of the print data regarding a print request, and a user name of a user having issued the print request; and the print data is supplied from the print queue to a printer to be printed, the print data controlling method comprising:
determining, when the print data regarding the current print request which is a subject of a print operation to be currently carried out is spooled in the print queue, whether to carry out the print operation with respect to the print data regarding the current print request on the basis of a result of comparison of the file size and user name included in the print request data regarding the current print request with the file size and user name included in the print request data regarding the previous print request.

23. The print data controlling method of claim 22, wherein, in the case where the file size and the user name included in the print request data regarding a current print request matches with the file size and user name included in the print request data regarding the previous print request, respectively, at least print operation to be currently carried out with respect to the print data regarding the current print request is canceled.

24. The print data controlling method of claim 22, wherein, in the case where the file size and the user name included in the print request data regarding a current print request matches with the file size and user name included in the print request data regarding the previous print request, respectively, the print operation with respect to the print data regarding the previous print request is carried out and print data regarding the current print request is deleted from the print queue.

25. The print data controlling method of claim 22, wherein, in the case where the file size and the user name included in the print request data regarding a current print request matches with the file size and user name included in the print request data regarding the previous print request, respectively, the print operation with respect to the print data regarding the current print request is carried out and the print data regarding the previous print request is deleted from the print queue.

26. The print data controlling method of claim 22, wherein the file size is an integrated value of character counts in print data regarding a print request.

27. The print data controlling method of claim 22, wherein the terminal device is connected to the printer via a printer server.

28. A print data controlling method comprising:
comparing, before carrying out a print operation of one of a plurality of sets of print data which have been already spooled in a print queue, a file size and user name of the one set of print data and file sizes and user names of the other sets of print data; and
canceling, when the file size and user name of the one set of print data match with a file size and user name of any of the other sets of print data, the print operation of at least either of the one set of print data and the any set of print data.

29. The print data controlling method of claim 28, wherein the print queue in which the plurality of sets of print data are spooled is in a server.

* * * * *